US010875003B2

(12) United States Patent
Zhang et al.

(10) Patent No.: US 10,875,003 B2
(45) Date of Patent: Dec. 29, 2020

(54) HIGHLY POROUS AEROGELS

(71) Applicant: NANYANG TECHNOLOGICAL UNIVERSITY, Singapore (SG)

(72) Inventors: Hua Zhang, Singapore (SG); Hengchang Bi, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 174 days.

(21) Appl. No.: 14/899,926

(22) PCT Filed: Jul. 1, 2014

(86) PCT No.: PCT/SG2014/000317
§ 371 (c)(1),
(2) Date: Dec. 18, 2015

(87) PCT Pub. No.: WO2015/005868
PCT Pub. Date: Jan. 15, 2015

(65) Prior Publication Data
US 2016/0137503 A1  May 19, 2016

Related U.S. Application Data

(60) Provisional application No. 61/844,069, filed on Jul. 9, 2013, provisional application No. 61/892,102, filed on Oct. 17, 2013.

(51) Int. Cl.
*B01J 13/00* (2006.01)
*C02F 1/28* (2006.01)
*B01J 20/20* (2006.01)
*B01J 20/28* (2006.01)
*B01J 20/30* (2006.01)
(Continued)

(52) U.S. Cl.
CPC .......... *B01J 13/0091* (2013.01); *B01J 20/20* (2013.01); *B01J 20/28023* (2013.01); *B01J 20/28047* (2013.01); *B01J 20/28054* (2013.01); *B01J 20/3071* (2013.01); *B01J 20/3078* (2013.01); *C01B 32/05* (2017.08); *C02F 1/281* (2013.01);
(Continued)

(58) Field of Classification Search
None
See application file for complete search history.

(56) References Cited

U.S. PATENT DOCUMENTS

| 5,958,589 A * | 9/1999 | Glenn ............... A01N 25/16 106/122 |
| 2011/0180751 A1* | 7/2011 | Rein ................ C08B 1/003 252/182.12 |
| 2013/0018112 A1* | 1/2013 | Thielemans ......... C08J 9/0066 514/781 |

FOREIGN PATENT DOCUMENTS

| CN | 103011864 A | 4/2013 |
| DE | 10 2006 049179 A1 | 4/2008 |
| WO | WO 2004/009673 A1 | 1/2004 |

OTHER PUBLICATIONS

Steel et al. (Carbon, 2005, 43, 1843-1856). (Year: 2005).*
(Continued)

*Primary Examiner* — Clare M Perrin
(74) *Attorney, Agent, or Firm* — Alston & Bird LLP

(57) ABSTRACT

Provided are methods for the manufacture of highly porous aerogels, particularly to twisted carbon fibers (TCF) and carbon microbelt (CMB) aerogels, by providing a carbon raw material and heating said carbon raw material under inert gas atmosphere and reduced pressure up to 900 ° C.

(Continued)

Figure 1:
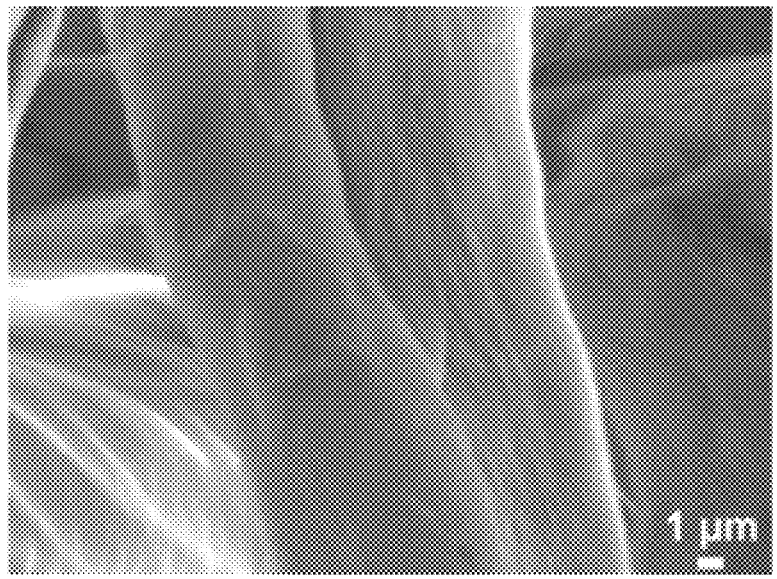
Figure 1:
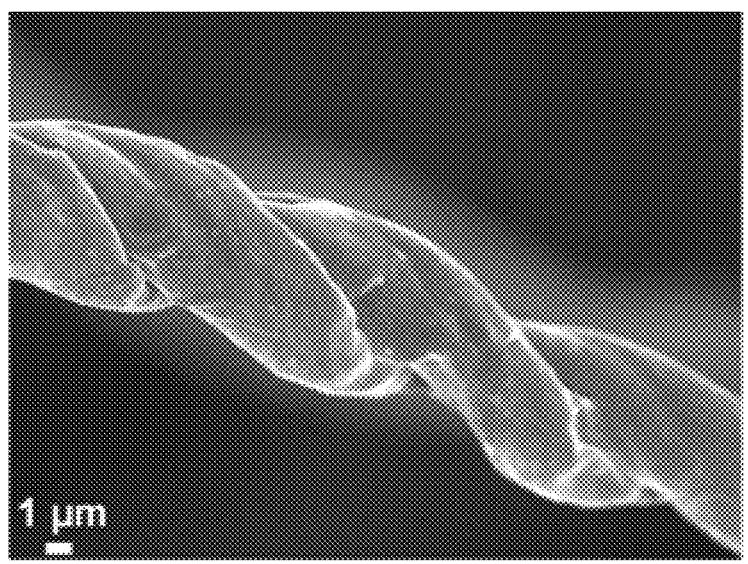

Also encompassed are the thus obtained aerogels and the use thereof, particularly for treating waste water.

13 Claims, 3 Drawing Sheets

(51) Int. Cl.
*C09K 3/32* (2006.01)
*C01B 32/05* (2017.01)
*C02F 101/32* (2006.01)

(52) U.S. Cl.
CPC ............... *C02F 1/283* (2013.01); *C09K 3/32* (2013.01); *C02F 2101/32* (2013.01)

(56) References Cited

OTHER PUBLICATIONS

Hildenbrand, C. (Nanostructured carbons from cellulose-derivative-based aerogels for electrochemical energy storage and conversion: evaluation as EDLC electrode material, MINES ParisTech, Ecole doctorale No. 432: SMI—Sciences des Metiers de l'Ingenieur, 2010, pp. 1-272. (Year: 2010).*
Steel et al. (Carbon, 2005, 43, 1843-1856).*
Lorenz et al. (DE # 102006049179; machine translation, 3 pages).*
Hildenbrand et al. ("Nanostructured carbons from cellulose-derivative-based aerogels for electrochemical energy storage and conversion: evaluation as EDLC electrode material", a doctoral thesis cited as D1 and discussed in the Written Opinion of the International Searching Authority for PCT/SG2014/000317).*
Desbrieres et al. (Carbohydrate Polymers, 1998, 37, 145-152).*
Hirrien et al. (Carbohydrate Polymers, 1996, 31, 243-252).*
Heath, et al. (Green Chemistry, 2010, 12, 1448-1453). (Year: 2010).*
Innerlohinger et al. (Macromol. Symp., 2006, 244, 126-135). (Year: 2006).*
Cotton Fiber, Science Direct overview, accessed online Mar. 17, 2020 at https://www.sciencedirect.com/topics/materials-science/cotton-fiber, pp. 1-15 (Year: 2012).*
Extended European Search Report from corresponding European Patent Application No. 14823508.8 dated Mar. 2, 2017.
Abedajo, M. O. et al., Porous Materials for Oil Spill Cleanup: A Review of Synthesis and Absorbing Properties, Journal of Porous Materials, 10 (2003) 159-170.
Annunciado, T. R. et al., Experimental Investigation of Various Vegetable Fibers as Sorbent Materials for Oil Spills, Marine Pollution Bulletin 50 (2005) 1340-1346.
Atta, A. M. et al., Crosslinked reactive Macromonomers Based on Polyisobutylene and Octadecyl Acrylate Copolymers as Crude Oil Sorbers, Reactive & Functional Polymers 66 (2006) 931-943.
Bastani, D. et al., Study of Oil Sorption by Expanded Perlite at 298.15 K, Separation and Purification Technology 52 (2006) 295-300.
Bayat, A. et al., Oil Spill Cleanup From Sea Water by Sorbent Materials, Chem. Eng. Technol., 28, No. 12 (2005) 1525-1528.
Bi, H. et al., Carbon Fiber Aerogel Made From Raw Cotton: A Novel, Efficient and Recyclable Sorbent for Oils and Organic Solvents, Adv. Mater. (2013) 1-6.
Bi, H. et al., Low Temperature Casting of Graphene With High Compressive Strength, Adv. Mater. 24 (2012) 5124-5129.
Bi, H. et al., Microscopic Bimetallic Actuator Based on a Bilayer of Graphene and Graphene Oxide, Nanoscale 5 (2013) 9123-9128.
Bi, H. et al., Spongy Graphene as a Highly Efficient and Recyclable Sorbent for Oils and Organic Solvents, Adv. Funct. Mater. 22 (2012) 4421-4425.
Bystrom, S. et al., Waste Paper Usage and Fiber Flow in Western Europe, Resources, Conservation and Recycling 15 (1995) 111-121.
Calvo, E. G. et al., Designing Nanostructured Carbon Xerogels, Nanomaterials, Chapter 9 (Dec. 2011) 187-234.
Carmody, O. et al., Surface Characterisation of Selected Sorbent Materials for Common Hydrocarbon Fuels, Surface Science 601 (2007) 2066-2076.
Celzard, A. et al., Carbon Gels Derived From Natural Resources, Bol. Grupo Espanol Carbon, No. 26 (Dec. 2012) 2-7.
Choi, H-M et al., Natural Sorbents in Oil Spill Cleanup, Environ. Sci. Technol. 26 (1992) 772-776.
Cong, H-P et al., Macroscopic Multifuncitonal Graphene-Based Hydrogels and Aerogels by a Metal Ion Induced Self-Assembly Process, ASC Nano, vol. 6, No. 3 (2012) 2693-2703.
Dalton, T. et al., Extent and Frequency of Vessel Oil Spills in US Marine Protected Area, Marine Pollution Bulletin 60 (2010) 1939-1945.
Dong, X. et al., Superhydrophobic and Superoleophilic Hybrid Foam of Graphene and Carbon Nanotube for Selective Removal of Oils and Organic Solvents From the Surface of Water, Chem. Commun. 48 (2012) 10660-10662.
Elkhatat, A. M. et al., Advances in Tailoring Resorcinol-Formaldehyde Organic and Carbon Cells, Adv. Mater. 23 (2011) 2887-2903.
Farag, R. K. et al., Synthesis and Characterization of Oil Sorbers Based on Docosanyl Acrylate and Methacrylates Copolymers, Journal of Applied Polymer Science, vol. 109 (2008) 3704-3713.
Fu, R. et al., The Fabrication and Characterization of Carbon Aerogels by Gelation and Supercritical Drying in Isopropanol, Adv. Funct. Mater., 13 No. 7 (2003) 558-562.
Gui, X. et al., Carbon Nanotube Sponges, Adv. Mater. 22 (2010) 617-621.
Hashim, D. P. et al., Covalently Bonded Three-Dimensional Carbon Nanotube Solids Via Boron Induced Nanojunctions, Scientific Reports 2:363 (2012) 1-8.
Hayase, G. et al., Facile Synthesis of Marshmallows-Like Macroporous Gels Usable Under Harsh Condictions for the Separation of Oil and Water, Angew. Chem. Int. Ed. 52 (2013) 1986-1989.
Hildebrand, C., Nanpstructured Carbons From Cellulose-Derivative-Based Aerogels for Electrochemical Energy Storage and Conversion: Evaluation as EDLC Electrode Material, Thesis, ParisTech (Sep. 9, 2010) 5-272.
Hu, B. et al., Engineering Carbon Materials From the Hydrothermal Carbonization Process of Biomass, Adv. Mater. 22 (2010) 813-828.
Huang, X. et al., Graphene-Based Electrodes, Adv. Mater. 24 (2012) 5979-6004.
Husing, N. et al., Aerogels—Airy Materials: Chemistry, Structure, and Properties, Angew. Chem. Int. Ed. 37 (1998) 22-45.
Hussein, M. et al., Heavy Oil Spill Cleanup Using Law Grade Raw Cotton Fibers: Trial for Practical Application, Journal of Petroleum Technology and Alternative Fuels, vol. 2(8) (2011) 132-140.
Jabli, M. et al., Adsorption of Acid Dyes From Aqueous Solution on a Chitosan-Cotton Composite Material Prepared by a New Pad-Dry Process, Journal of Engineered Fibers and Fabrics, vol. 6, Issue 3 (2011) 1-12.
Kaewprasit, C. et al., Quality Measurements; Application of Methylene Blue Adsorption to Cotton Fiber Specific Surface Area Measurement: Part 1. Methodology, The Journal of Cotton Science, 2 (1998) 164-173.
Lee, S-H et al., Biodegradable Polyurethane Foam From Liquefied Waste Paper and Its Thermal Stability, Biodegradability, and Genotoxicity, Journal of Applied Science, vol. 83 (2002) 1482-1489.
Li, A. et al., Superhydrophobic Conjugated microporous Polymers for Separation and Adsorption, Energy Environ. Sci., 4 (2011) 2062-2065.
Liang, H-W et al., Macroscopic Scale Template Synthesis of Robust Carbonaceous Nanofiber Hydrogels and Aerogels and Their Applications, Angew. Chem. Int. Ed. 51 (2012) 5101-5105.
Lillo-Rodenas, M. A. et al., Behaviour of Activated Carbons With Different Pore Size Distributions and Surface Oxygen Groups for Benzene and Toluene Adsorption at Low Concentrations, Carbon 43 (2005) 1758-1767.
Moigne, N. L. et al., Rotation and Contraction of Native and Regenerated Cellulose Fibers Upon Swelling and Dissolution: The Role of Morphological and Stress Unbalances, Cellulose 17 (2010) 507-519.

(56) References Cited

OTHER PUBLICATIONS

Nada, A. M.A. et al., Differential Adsorption of Heavy Metal Ions by Cotton Stalk Cation-Exchangers Containing Multiple Functional Groups, Journal of Applied Polymer Science, vol. 101 (2006) 4124-4132.
Nguyen, D. D. et al., Superhydrophobic and Superoleophilic Properties of Graphene-Based Sponges Fabricated Using a Facile Dip Coating Method, Energy Environ. Sci., 5 (2012) 7908-7912.
Niu, Z. et al., A Leavering Strategy to Prepare Reduced Graphene Oxide Foams, Adv. Mater. (2012) 4144-4150.
Pierre, A. C. et al., Chemistry of Aerogels and Their Applications, Chem. Rev. 102 (2002) 4243-4265.
Radetic, M. M. et al., Recycled Wool-Based Nonwoven Material as an Oil Sorbent, Environ. Sci. Technol. 37 (2003) 1008-1012.
Shen, J. et al., Resorcinol Formaldehyde Derived Carbon Aerogel Films, Fourth International Conference on Thin Films Physics and Applications, Proceedings of SPIE, vol. 4086 (2000) 811-814.
Shimada, M. et al., The Properties of Activated Carbon Made From Waste Newsprint Paper, Journal of Porous Materials 6 (1999) 191-196.
Shin, M. K. et al., Elastomeric Conductive Composites Based on Carbon Nanotube Forests, Adv. Mater. 22 (2010) 2663-2667.
Sun, H. et al., Multifunctional, Ultra-Flyweight, Synergistically Assembled Carbon Aerogels, Adv. Mater. 25 (2013) 2554-2560.
Toyoda, M. et al., Heavy Oil Sorption Using Exfoliated Graphite New Application of Exfoliated Graphite to Protect Heavy Oil Pollution, Carbon 38 (2000) 199-210.
Toyoda, M. et al., Sorption and Recovery of Heavy Oils by Using Exfoliated Graphite, Spill Science & Technology Bulletin, vol. 8, Nos. 5-6 (2003) 467-474.
Updegraff, D. M., Utilization of Cellulose From Waste Paper by Myrothecium Verrucaria, Biotechnology and Engineering, vol. XIII (1971) 77-97.
Vilatela, J. J. et al., Yarn-Like Carbon Nanotube Fibers, Adv. Mater. 22 (2010) 4959-4963.
Vynios, D. H. et al., Enzymatic Production of Glucose From Waste Paper, BioResources 4(2) (2009) 509-521.
Wang, G. et al., Sorption and Regeneration of Magnetic Exfoliated Graphite as a New Sorbent for Oil Pollution, Desalination 263 (2010) 183-188.
Wang, H. et al., New Generation Material for Oil Spill Cleanup, Envrion Sci Pollut Res 21 (2014) 1248-1250.
Wayman, M. et al., Bioconversion of Waste Paper to Ethanol, Process Biochemistry 27(1992) 239-245.
Wu, C. et al., Mechanically Flexible and Multifunctional Polymer-Based Graphene Foams for Elastic Conductors and Oil-Water Separators, Adv. Mater. 25 (2013) 5658-5662.
Wu, D. et al., Preparation of Low-Density Carbon Aerogels by Ambient Pressure Drying, Carbon 42 (2004) 2033-2039.
Wu, Z-Y et al., Ultralight, Flexible, and Fire-Resistant Carbon Nanofiber Aerogels From Bacterial Cellulose, Angew. Chem. Int. Ed. 5 (2013) 2925-2929.
Yang, H. et al., Temperature-Triggered Collection and Release of Water From Fogs by a Sponge-Like Cotton Fabric, Adv. Mater. 25 (2013) 1150-1154.
Yen, H-W et al., Anaerobic Co-Digestion of Algal Sludge and Waste Paper to Produce Methane, Bioresource Technology 98 (2007) 130-134.
Yin, Z. et al., Graphene-Based Materials for Solar Cell Applications, Adv. Energy Mater. 4 (2014) 19 pages.
Yuan, J. et al., Superwetting Nanowire Membranes for Selective Absorption, Nature Nanotechnology, vol. 3 (2008) 332-336.
Xu, Y. et al., Self-Assembled Graphene Hydrogel via a One-Step Hydrothermal Process, ASC Nano, vol. 4, No. 7 (2010) 4324-4330.
Zhao, J. et al., Graphene Sponge for Efficient and Repeatable Adsorption and Desorption of Water Contaminations, J. Mater. Chem. 22 (2012) 20197-20202.
Zhao, Y. et al., A Versatile, Ultralight, Nitrogen-Doped Graphene Framework, Angew. Int. Ed. 51 (2012) 11371-11375.
Zorpas, A. A. et al., Waste Paper and Clinoptilolite as a Bulking Material With Dewatered Anaerobically Stabilized Primary Sewage Sludge (DASPSS) for Compost Production, Waste Management 23 (2003) 27-35.
Paper recycling—Wikipedia, the free encyclopedia [online] [retrieved Feb. 16, 2016]. Retreived from the Internet: <URL: https://en.wikipedia.org/wiki/Paper-recycling>. (dated Feb. 2016) 7 pages.
International Search Report and Written Opinion for Application No. PCT/SG2014/000317 dated Aug. 1, 2014.
Office Action for European Application No. 14 823 508.8 dated Jun. 27, 2019, 7 pages.
Guilminot, E. et al., *New nanostructured Carbons Based on Porous Cellulose: Elaboration, Pyrolysis and Use as Platinum Nanoparticles Substrate for Oxygen Reduction Electrocatalysis*, Journal of Power Sources, 185 (2008) 717-726.

* cited by examiner

HIGHLY POROUS AEROGELS

CROSS-REFERENCE TO RELATED APPLICATIONS

The present application is a national phase entry of PCT/SG2014/000317, filed on Jul. 1, 2014, which claims the benefit of priority of United States of America Provisional Patent Application Nos. 61/844,069 filed on Jul. 9, 2013 and 61/892,102 filed on Oct. 17, 2013, the entire contents of each are hereby incorporated by reference in its entirety for all purposes.

FIELD

The present invention lies in the field of highly porous carbon aerogels, their synthesis and use, particularly for the treatment of waste water.

BACKGROUND

Carbon-based aerogels have attracted much attention due to their low density, high electrical conductivity, porosity, specific surface area, and chemical stability. They demonstrate a great potential for the removal of pollutants and the separation of oil and water. Usually, there are three main methods to fabricate carbon aerogels. The pyrolysis of organic aerogels in an inert atmosphere is a traditional method, which only can produce fragile carbon aerogels with high density. Carbon nanotubes (CNT) sponges or its derivative sponges fabricated by chemical vapor deposition (CVD) show high absorption capacities for oils as well as for organic solvents. However, the expensive precursors and complex equipments dramatically hamper the large-scale production of these carbon-based aerogels for real world applications. Graphene oxide (GO), a precursor for graphene, which can be produced in large scale can be assembled into three dimensional structures through self-gelation. The aerogels show a high adsorption capacity and a good recyclability. However, the use of large amounts of chemicals and production of acidic waste during preparation of GO the methods is not satisfying.

Natural materials, due to their low cost, rich source, and non-toxicity are attracting more and more attention in producing carbon-based materials. For example, raw cotton fiber contains cellulose as main ingredient and little impurities such as proteinaceous materials, waxes, pectins and small amounts of organic acids and ash producing inorganic materials. Raw cotton fibers have been investigated on adsorbing dyes, heavy metals, and heavy oils as well. However, many disadvantages, such as poor buoyancy characteristics, relatively low oil sorption capacity, low hydrophobicity, and bad recyclability have been observed. These disadvantages hamper its application in removal of pollutants and the separation of oils and water.

Thus, there is a need for a facile and cost-saving excess to highly porous aerogels with high adsorption capacity and hydrophobicity.

SUMMARY

In a first aspect, the present invention provides a method for manufacturing highly porous aerogels, wherein the method comprises the steps of:
(i) providing a carbon raw material; and
(ii) heating the carbon raw material under inert gas atmosphere and reduced pressure up to 900° C.

In another aspect, the present invention is directed to highly porous aerogels obtainable by the method as disclosed herein.

In a further aspect, the present invention relates to the use of said highly porous aerogels for treating waste water.

In a still further aspect, the present invention relates to a method for the treatment of waste water, comprising
(i) contacting the highly porous aerogel described herein with the waste water; and
(ii) separating the treated waste water from the aerogel.

DETAILED DESCRIPTION OF THE FIGURES

FIG. 1: A) High-magnification image of the cotton and B) High-magnification image of the TCF aerogel containing the twisted fiber structure.

Figure 2:
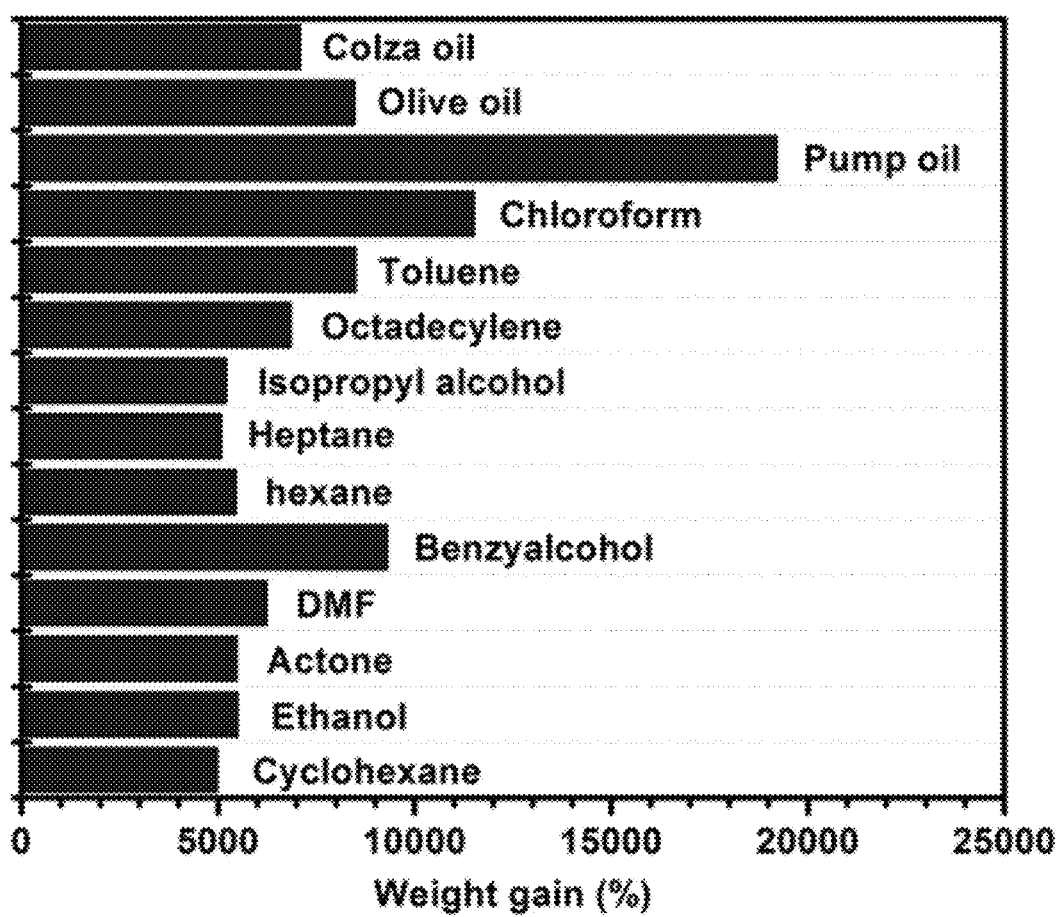

FIG. 2: Sorption efficiency of the TCF aerogel for various organic liquids. The weight gain is defined as the weight ratio of the absorbate to the dried TCF aerogel.

Figure 3:
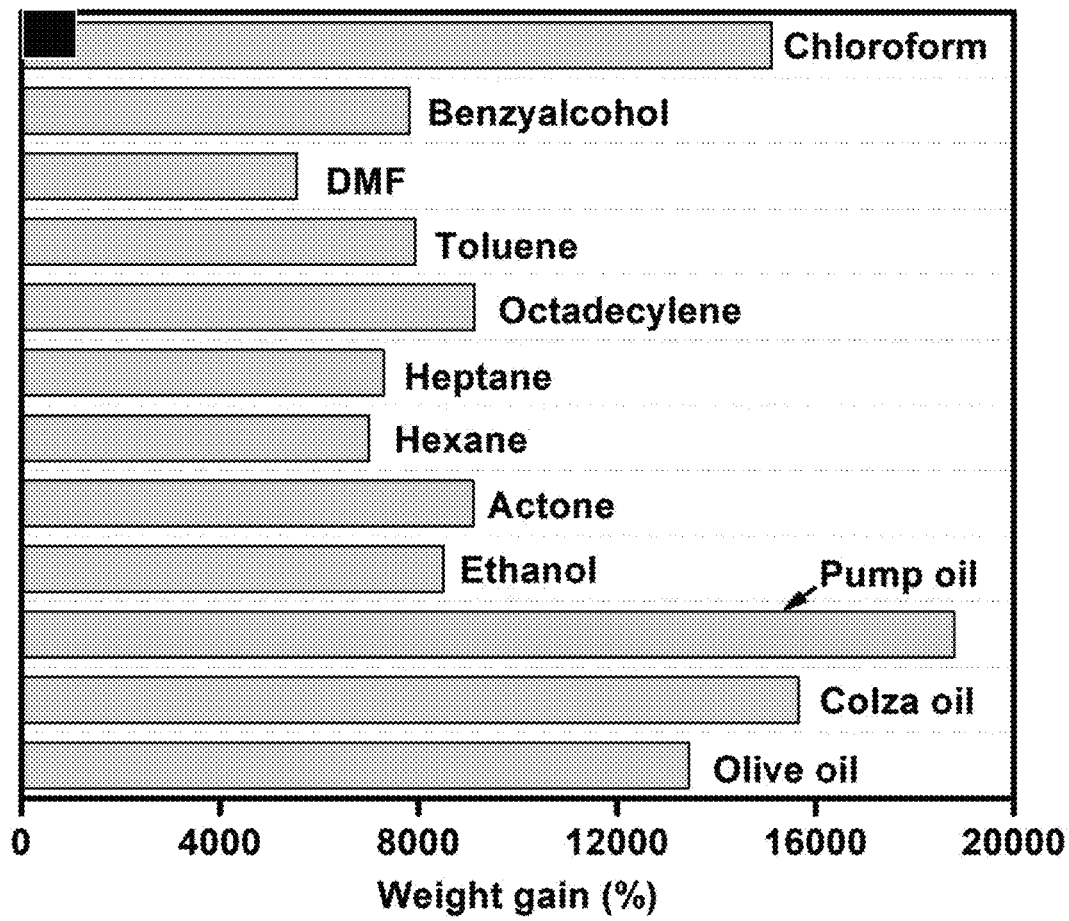

FIG. 3: Sorption efficiency of the CMB aerogel on various organic liquids. The weight gain here is defined as the weight ratio of the absorbate to the dried CMB aerogel.

DETAILED DESCRIPTION

The present invention is based on the inventors' surprising finding that heating a carbon raw material, particularly cotton, under inert gas atmosphere and reduced pressure up to 900° C. provides for a highly porous and hydrophobic, non-toxic aerogel with a high surface. Due to its hydrophobicity the obtained aerogel adsorbs a wide range of organic solvents and oils with excellent recyclability using facile distillation, burning, or squeezing methods. The aerogel still possesses high adsorption capacity after five cycles. The route to manufacture these aerogels, as described herein, is facile and environmentally sustainable, as no additional expensive and complex purification steps are required and no waste is produced during the manufacture. Additionally, the starting materials, such as cotton and wastepaper, are easy to obtain and cost-effective.

For certain applications, such as in Li-ion batteries and super capacitors, for water splitting, chemical and biosensing, nanodevices, and reaction catalysis, the obtained aerogels can further be modified with nanomaterials, such as 2D materials like graphene; metal dichalcogenides including $MoS_2$, $TiS_2$, $WS_2$, $TaS_2$, $WSe_2$, $TiSe_2$, and $TaSe_2$; metal particles and alloys, such as Au, Ag, Pt, Pd, Cu, AuAg alloy, and PtPd alloy; and metal oxide particles, such as nickel oxide, manganese oxide, iron oxide, zinc oxide, and $TiO_2$.

For applications in energy storage devices and environmental protection, particularly in waste water treatment, the aerogels can be used without further modifications and purification.

Without wishing to be bound to a specific theory, it is believed that the above outlined advantageous properties of the aerogels are attributable to the specific production method described herein, particularly the features of reduced pressure and inert gas atmosphere, as well as to the selection of the used carbon raw material.

Based on this finding, in a first aspect the present invention thus relates to a method for manufacturing a highly porous aerogel, the method comprising:
(i) providing a carbon raw material; and
(ii) heating the carbon raw material under inert gas atmosphere and reduced pressure up to 900° C.

The term "highly porous aerogel", as used herein, relates to aerogels based on the chemical element carbon with open pores and a high porosity (up to ca. 99.5%) which are flexible and have a sponge-like texture. The structure of the obtained aerogel depends on the carbon raw material used as starting material. In case cotton is used as the carbon raw material, the obtained aerogel has an interconnected twisted carbon fiber (TCF) structure. The fibers in such a TCF aerogel show a diameter of 5 to 10 μm and a twisted morphology with a pitch length in the range of 10 to 20 μm. These fibers are cross-linked. When paper is used as carbon raw material the resulting aerogel shows the same structure as the TCF aerogel, but the fibers of the manufactured aerogel are belt-like and not twisted. Most of the belt-like fibers are 5 to 10 μm wide and are cross-linked with each other resulting in advantageous mechanical properties, such as stiffness. This type of aerogel is referred to herein as a carbon microbelt (CMB) aerogel and is obtained by using paper and/or wastepaper as carbon raw material. The aerogels have, due to their structure and porosity, a large surface area which makes them particularly suitable for the uses according to the present invention.

The term "carbon raw material", as used herein, refers to the starting material of the aerogels as disclosed herein. In various embodiments, carbohydrates, in particular polysaccharides are used as the carbon raw material. In various embodiments of the present invention, the carbon raw material is a cellulosic material. In general the term "cellulosic material", as used herein, relates to cellulose and various cellulose derivatives as well as mixtures thereof.

Cellulose is a polysaccharide with a linear chain consisting of β(1,4) linked D-glucose units and has the following Formula (I)

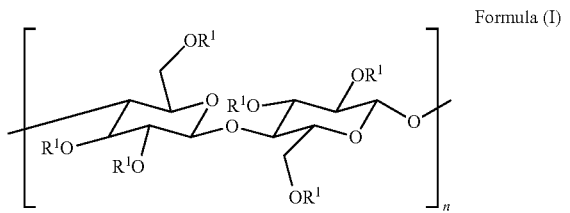

Formula (I)

wherein n is from 25 to 10,000, preferably from 50 to 5,000 and each $R^1$ is hydrogen.

The term "cellulose derivate", as used herein, relates to an organic compound of Formula (I), wherein n is from 25 to 50,000 and each $R^1$ in each unit is, independently selected from the group consisting of hydrogen, a linear or branched, substituted or unsubstituted alkyl with 1 to 6 carbon atoms, and —$N(R^a)(R^b)$ with the proviso that at least one of $R^1$ is not hydrogen. Each $R^a$ and $R^b$ is independently selected from the group consisting of linear or branched alkyl with 1 to 6 carbon atoms. In a preferred embodiment each $R^1$ is independently selected from the group consisting of methyl and ethyl. In a further preferred embodiment each $R^a$ and $R^b$ of —$N(R^a)(R^b)$ is independently selected from the group consisting of methyl and ethyl. In various embodiments, n is from 50 to 5,000.

Alternatively, in another embodiment, the polysaccharide may be alginic acid. Alginic acid is a linear copolymer with homopolymeric blocks of (1,4)-linked β-D-mannuronate and its C-5 epimer α-L-guluronate residues, respectively, covalently linked together in different sequences or blocks. Alginic acid has the Formula (II)

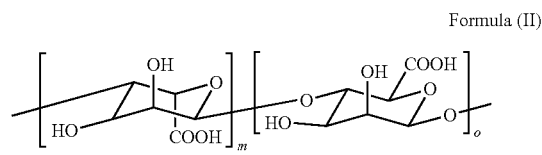

Formula (II)

wherein m and o are independently from each other 1 to 25,000. Alginic acid is distributed widely in the cell walls of brown algae, where it forms together with water a viscous gum.

In accordance with the present invention, all carbon raw materials wherein cellulose or a cellulosic material is the main ingredient can be used. "Main ingredient", as used in this context, means, in various embodiments, that the cellulose/cellulosic material makes up at least 75 weight-% of the carbon raw material. Consequently, in various embodiments, the carbon raw material is selected from the group consisting of cotton, paper, wastepaper, hemp fiber, pulp, starch, brown algae, and mixtures thereof.

According to the present invention, cotton may be used as the carbon raw material. Cotton is a natural fiber obtained from the hair of the seed plants of the genus *Gossypium*. Cotton contains cellulose as main ingredient and further ingredients like proteins, waxes and other plant debris. Cotton as described herein may be used naturally or, alternatively, treated by conventional chemical and/or mechanical methods. Preferably, natural, untreated cotton is used.

In other embodiments, paper may be used as the carbon raw material. Papers are flexible sheets obtained by pressing together moist fibers, typically cellulose pulp derived from wood, rags or grasses, to form sheets and subsequently drying said sheets. Optionally, papers may further comprise glue and fillers and may comprise papers as they are, for example, used in books, documents, newspapers, cardboards, and the like.

Further, in accordance with the present invention, wastepaper may be used as the carbon raw material. "Wastepaper", as used herein, relates to paper as defined above which has been discarded after use, for example originating from discarded books, newspapers, packages and the like.

In still further embodiments, hemp fibers can be used as the carbon raw material. These fibers are fibers from the bast of *cannabis* which is a genus of flowering plants including the single species *Cannabis sativa*.

In another embodiment, pulp may be used as carbon raw material. The term "pulp", as used herein, refers to a fibrous slurry with cellulose as main ingredient prepared by chemical and mechanical separation from wood or wastepaper. Typically, the slurry is an aqueous slurry.

In still other embodiments, starch may be used as the carbon raw material. Starch is a carbohydrate consisting of a large number of glucose units joined by glycosidic bonds. This polysaccharide is inter alia produced by plants and is contained in large amounts in potatoes, corn, wheat, and rice.

In still further embodiments, brown algae can be used as carbon raw material which are a large group of mostly marine multicellular algae including many seaweeds of colder Northern Hemisphere waters, such as *Macrocystis, Sargassum*, and *Ascophyllum nodosum*. These algae contain alginic acid in large amounts.

The carbon raw material is selected depending on the desired properties of the aerogel. All carbon raw materials disclosed herein are in principle suitable to provide for aerogels with a high hydrophobic property and porosity, but the obtained aerogels may vary with respect to their molecular structure.

In step (i) of the method described herein, a carbon raw material is provided. This step may comprise treatments necessary to prepare the carbon raw material for the heating in step (ii). Consequently, the providing step may for example include washing and drying the raw material. Thus, in a preferred embodiment of the invention, the providing step (i) comprises washing and/or drying the carbon raw material. The carbon raw material can be washed with any solvent or solvent mixtures which are suitable to remove undesired compounds and substances, such as without limitation contaminants, from said raw materials. Washing as used herein includes contacting the material with a detergent, including water, by, for instance, wetting, rinsing, or dipping. The purpose of washing the carbon raw material is to remove compounds and substances from the carbon raw material which may have a negative impact during the subsequent steps, for example in that they decrease porosity or interfere with the aerogel formation. The compounds and materials that are to be removed include any kind of dirt, dust, and/or inorganic or organic contamination. In a preferred embodiment the carbon raw material is washed with deionized water. If desired, the washing may be carried out at elevated temperature.

If the contaminating substance, as described above, is volatile, the organic raw material may also be purified by heating. Such contaminants which may be removed by a heating step may include, for example, organic solvents. The heating temperature can be adjusted depending on the actual contaminant.

In various embodiments, the washed carbon raw material is dried and the solvent used for washing is removed. In a preferred embodiment, drying in step (i) is conducted at a temperature from about 10° C. to about 200° C. In a more preferred embodiment drying in step (i) is conducted at a temperature from about 20° C. to about 150° C. and in an even more preferred embodiment drying is conducted at a temperature from about 40° C. to about 90° C.

Optionally, the drying in step (i) can be conducted under reduced pressure, for example, when the carbon raw material is temperature sensitive. Therefore, the drying in step (i) can be conducted in a glove-box.

As a further option the drying step of step (i) can be conducted by freeze-drying.

"About", as used herein, refers to the numerical value it relates to ±10%.

In step (ii) of the method disclosed herein, the carbon raw material is heated under inert gas atmosphere and reduced pressure. In general, an "inert gas", as used herein, refers to a gas that does not undergo chemical reactions with the carbon raw material under a set of given reaction conditions. Thus, in principle all gases that satisfy this requirement can be used, including without limitation noble gases, such as helium or argon, and nitrogen. Preferably, nitrogen or argon is used.

Before the carbon raw material is heated the carbon raw material is inserted into a reaction vessel suitable for carrying out step (ii). The reaction vessel has to be an airtight and heatable reaction vessel, chamber, furnace, or the like. For example, an airtight furnace can be used as reaction vessel. Preferably, a tubular furnace is used.

In general, the heating in step (ii) can be conducted by all known methods, techniques, and equipment. Before the carbon raw material is heated the reaction vessel is flushed with the used inert gas at least once, for example 2, 3, 4, 5, or even more times, to ensure that no air, in particular oxygen, or water remains in the reaction vessel. Such techniques and methods are known in the art. In various embodiments the reaction temperature of step (ii) is from about 200° C. to about 900° C. Preferably, the reaction temperature of step (ii) is from about 400° C. to about 900° C. and more preferably from about 600° C. to about 900° C. or from about 700° C. to about 900° C. In an even more preferred embodiment the reaction temperature of step (ii) is from about 750° C. to about 850° C.

Further, step (ii) is carried out under reduced pressure. The term "reduced pressure", as used herein, refers to pressure substantially less than 1013 mbar. In a preferred embodiment of the present invention, the pressure is of from about 0.1 mbar to about 500 mbar. In a more preferred embodiment, step (ii) is conducted at a pressure of from about 0.25 mbar to about 250 mbar. In most preferred embodiments, step (ii), as described herein, is conducted at a pressure of from about 0.5 mbar to about 100 mbar. The pressure can be reduced prior to or during the heating and the reduced pressure is preferably maintained during step (ii), for example by using a suitable vacuum pump connected to the reaction chamber. Due to the absence of oxygen and water the carbon raw material is thermochemically decomposed and burning of said material is prevented. The reduced pressure supports the pyrolysis and the molecules generated during the decomposition can be separated from the developing aerogel.

In various embodiments, steps (i) and (ii) are conducted in the same reaction vessel.

In various embodiments, the reaction time of step (ii) is from about 0.1 hour to about 12 hours. The reaction time can also be from about 0.1 hour to about 8 hours or from about 0.25 hour to about 6 hours. Preferably, the reaction time of step (ii) is from about 0.5 hour to about 4 hours, more preferably from about 1 hour to about 3 hours, and even more preferably about 2 hours. The term "reaction time", as used herein, relates to the time period over which the desired reaction conditions, i.e. elevated temperature and reduced pressure are maintained. Any warming up phase needed to reach the desired reaction temperature is however not included in the given reaction time.

In various embodiments of the present invention, the heating rate in step (ii) is from about 0.1° C./min to about 20° C./min. The heating rate can also be from about 1° C./min to about 15° C./min. Preferably, the heating rate in step (ii) is from about 1.5° C./min to about 10° C./min or from about 2° C./min to about 8° C./min. More preferably, the heating rate in step (ii) is from about 4° C./min to about 6° C./min and most preferably about 5° C./min.

Cotton fibers naturally possess a twisted structure with 3.9 to 6.5 twists per millimeterlength.[1] The density of the twists is increased by the present method, wherein a heating rate of 5° C./min generates more twists than 15° C./min. However, a heating rate of 15° C./min will shorten the fabrication process thereby saving energy cost. As a result, the heating rate may be selected on the basis of the individual preferences. Generally, the more twists are generated the more rigid and mechanical stable is the obtained aerogel.

Further, it is advantageous that by-products, which are generated during the heating, are continuously removed during carrying out the method, in particular step (ii). Low pressure pyrolysis with constant removal of the by-products is ideal. It has been demonstrated that pyrolysis under an argon atmosphere generates the described twisted structure. Ideally, argon should be continuously flow through the reaction chamber, for example from an inlet to an outlet, at a sufficient flow rate in order to increase the diffusion rate and remove generated by-products. On the other hand, the gas flow rate should not be too high, as the flow of gas will cause undesired temperature fluctuations at the fiber surface.

In a preferred embodiment of the present invention the method comprises pretreating the carbon raw material. In a preferred embodiment the carbon raw material is pretreated with water and/or an aqueous solution. The aqueous solution may comprise an acid. The acid may be selected from the group consisting of hydrochloric acid, sulfuric acid, phosphorous acid, nitric acid, acetic acid, and mixtures thereof. Preferably, the acid is hydrochloric acid. Optionally, the pretreatment may comprise treatment with both, water and an aqueous solution of an acid, at least once. The time of the pretreatment may vary and depends on the carbon raw material. In various embodiments, the pretreatment is carried out for about 0.1 hour to about 80 hours, about 1 hour to about 72 hours or about 6 hours to about 60 hours.

When the carbon raw material is selected from the group consisting of paper, wastepaper, and mixtures thereof the carbon raw material is preferably pretreated with an aqueous solution comprising an acid. Preferably, the used acid is hydrochloric acid. In a preferred embodiment, paper and/or wastepaper are pretreated for about 6 hours to about 24 hours. The pretreating procedure softens the raw material and certain ingredients of the paper and/or wastepaper, such as fillers, glue, and ingredients other than cellulose, are dissolved. Subsequently, the cellulose is separated from the pretreatment solution and optionally dried before the pretreated raw material is further processed in step (i) as disclosed herein. Such a pretreatment may also include one or more washing steps using water. If necessary, each pretreatment step may be repeated several times. For example, the raw material may be subjected to acid solution treatment twice, a water treatment, and a subsequent drying step.

The present invention also encompasses the highly porous aerogel obtainable by the method as described herein.

In a preferred embodiment the highly porous aerogel is a twisted carbon fiber (TCF) aerogel.

In another preferred embodiment the highly porous aerogel is a carbon microbelt (CMB) aerogel. The CMB aerogel can absorb a wide range of organic solvents and oils with a maximum sorption capacity up to 188 times the weight of the pristine CMB aerogel. Moreover, the CMB aerogel exhibits the excellent recyclability (up to 5 times), and maintains a high sorption capacity even after five cycles through distillation or squeezing.

As already outlined herein, the type of obtained aerogel depends on the used carbon raw material.

In a further aspect, the present invention is directed to the use of the highly porous aerogel for treating waste water or methods for the treatment of waste water comprising the use of the aerogels described herein.

The term "waste water", as used herein, refers to water which is contaminated with any organic material, which may be liquid under standard conditions (20° C., 1013 mbar). While in principle any weight ratio of water and the organic contaminant may be used, in various embodiments the weight ratio of water and the organic material ranges from about 1:1 to about 1,000,000:1 or more. In a preferred embodiment of the present invention, the waste water comprises water and an organic liquid. The organic liquid can be any hydrophobic organic liquid which is suitable to penetrate into the aerogel due to its hydrophobic character, and includes, without limitation, liquid hydrocarbons, such as (crude) oil and oil-based products, such as refined oil products, including kerosene, gasoline and the like. Other examples include without limitation chloroform, benzylalcohol, DMF, toluene, octadecylene, hexane, heptane, acetone, ethanol, petroleum, pump oil, colza oil, and olive oil.

"Treating", as used herein in relation to waste water treatment, includes at least partially purifying the waste water by separating contaminants that adsorb to the aerogels from the waste water, thus, after separation of the aerogel from the treated water, providing at least partially purified water, i.e. water wherein at least part of the contaminants have been removed. The contaminants are preferably liquid organic contaminants, as described above.

In various embodiments, the use of the aerogels as disclosed herein comprises bringing the highly porous aerogel into contact with the waste water by, for example, dipping the aerogel into the waste water. The waste water can also be flowed over the aerogel, with the aerogel being fixated, for example in a device, on a plate, or in a pipe. In case the organic contamination and the water form a biphasic system, the aerogel needs to contact the organic phase in order to adsorb the organic material.

Due to its excellent adsorbing properties the aerogels as disclosed herein are suitable for cleanup and recovery of oil spills.

The absorption capacity of the aerogels can reach up to 192 times the weight of the pristine TCF aerogels. The CMB aerogel possesses an adsorption capacity of 188 times the weight of the pristine CMB aerogel. The aerogel can be simply recycled by distilling, burning, or squeezing methods. Moreover, after five adsorption/recycling cycles, TCF and CMB aerogels still maintain their high adsorption capacity.

The following examples are provided to better illustrate the claimed invention and are not be interpreted in any way as limiting the scope of the invention. All specific compounds, materials, and methods described below, in whole or in part, fall within the scope of the invention. These specific compounds, materials, and methods are not intended to limit the invention, but merely to illustrate specific embodiments falling within the scope of the invention. One skilled in the art may develop equivalent compounds, materials, and use without the exercise of inventive capacity and without departing from the scope of the invention. It is the intention of the inventors that such variations are included in the scope of the present invention.

All references cited herein are incorporated by reference in their entirety.

EXAMPLES

General Information

Preparation of Twisted Carbon Fibers (TCF) Aerogels:

Cylindrical shaped pieces of raw cotton were rinsed several times by deionized water, and then dried in vacuum at 60° C. for 12 h. After that, the dried cotton was transferred to a tubular furnace for pyrolysis. In order to remove the air trapped in the cotton completely, we first evacuated the furnace, and then introduced argon gas, followed by evacuating the furnace again. After that, the furnace was heated up to 800° C. at a heating rate of 5° C./min and held at 800° C. for 2 h in argon atmosphere at a low pressure of ~0.5 mbar. Finally, the furnace was cooled down to room temperature naturally to obtain the low-density TCF aerogels.

Characterization of Raw Cotton and TCF Aerogel:

All samples were characterized by a field emission scanning electron microscope (FESEM, JEOL, JSM-7600F), and Fourier transform infrared spectroscopy (FTIR, Perkin Elmer Instruments Spectra, GX FTIR spectrometer).

Sorption of Oils and Organic Solvent of TCF Aerogel:

In a typical sorption test, a TCF aerogel was placed in contact with an organic liquid until the aerogel was filled with the organic liquid completely, and then taken out for weight measurement. In order to avoid evaporation of the absorbed organic liquid, especially for those with low boiling points, the weight measurement should be done quickly. The weight of a piece of TCF aerogel before and after sorption was recorded for calculating the weight gain.

Preparation of Carbon Microbelt (CMB) Aerogels:

60 mg of wastepaper scraps were mixed with 40 mL of distilled water and left still for 24 h. Then 10 mL of hydrochloric acid (10%) was added to the aforementioned mixture, which was left undisturbed for another 12 h. The solid in the mixture was washed by centrifugation for several times with distilled water to remove chloride ions, and then dried overnight in an oven at 60° C. The dried sample was poured into 30 mL of distilled water followed by strong agitation under vigorous magnetic stirring to form a uniform mixture which is called pulp. The pulp was then subjected to freeze-drying to form pulp fiber aerogel. After that, the pulp fiber aerogel was transferred into a tubular furnace for pyrolysis. In order to remove the air trapped in the pulp fiber aerogel completely, evacuated the furnace before introduction of argon gas, followed by evacuation of the furnace again. After that, the furnace was heated up to 850° C. at a heating rate of 5° C. $min^{-1}$ and kept at 850° C. for 2 h in argon atmosphere at pressure of ~0.5 mbar. Finally, the furnace was cooled down to room temperature naturally to obtain the low-density CMB aerogels.

Characterization of Pulp Fiber Aerogels and CMB Aerogels:

All samples were characterized by a field emission scanning electron microscope (FESEM, JEOL, JSM-7600F), and Fourier transform infrared spectroscopy (FTIR, Perkin Elmer Instruments Spectra, GX FTIR spectrometer).

Sorption of Oils and Organic Solvents of Carbon Microbelt (CMB) Aerogels:

In a typical sorption test, a CMB aerogel was placed in contact with an organic liquid until the aerogel was filled with the organic liquid completely, which was then taken out for weight measurement. In order to avoid evaporation of the absorbed organic liquid, especially for those with low boiling points, the weight measurement should be done quickly. The weight of a piece of CMB aerogel before and after sorption was recorded for calculation of the weight gain.

REFERENCES

[1] N. Le Moigne, J. Bikard, P. Navard, *Cellulose* 2010, 17, 507.

While particular preferred and alternative embodiments of the present intention have been disclosed, it will be apparent to one of ordinary skill in the art that many various modifications and extensions of the above described technology may be implemented using the teaching of this invention described herein. All such modifications and extensions are intended to be included within the true spirit and scope of the invention as discussed in the appended claims.

The invention claimed is:

1. A method for manufacturing a twisted carbon fiber (TCF) porous, hydrophobic aerogel, the method comprising:
   (i) providing cotton comprising fibers having a twisted structure; and
   (ii) heating the cotton under inert gas atmosphere and at a reduced pressure of about 0.1 mbar to about 500 mbar to any temperature from about 200° C. up to 900° C., thereby decomposing the cotton and producing the twisted carbon fiber (TCF) porous, hydrophobic aerogel.

2. The method according to claim 1, wherein the cotton comprises cellulosic material of Formula (I)

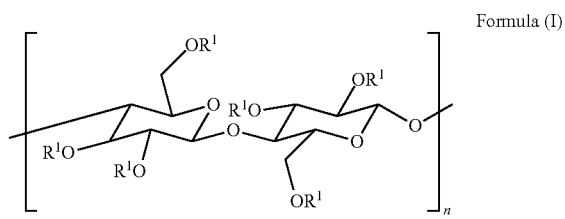

Formula (I)

wherein, n is from 25 to 10,000, preferably from 50 to 5,000, and $R^1$ is hydrogen.

3. The method according claim 1, wherein step (ii) is conducted at a pressure of about 0.25 mbar to about 250 mbar, or of about 0.5 mbar to about 100 mbar.

4. The method according to claim 1, wherein step (i) comprises washing and/or drying the cotton.

5. The method according to claim 4, wherein deionized water is used for washing in step (i).

6. The method according to claim 4, wherein drying in step (i) is conducted at a temperature from about 10° C. to about 200° C., from about 20° C. to about 150° C., or from about 40° C. to about 90° C.

7. The method according to claim 4, wherein drying is conducted under reduced pressure.

8. The method according to claim 1, wherein step (ii) comprises heating to a temperature, from about 400° C. to about 900° C., from about 600° C. to about 900° C., from about 700° C. to about 900° C., from about 750° C. to about 850° C. or of about 800° C.

9. The method according to claim 1, wherein step (ii) comprises heating for a time period of from about 0.1 hour to about 12 hours, from about 0.1 hour to about 8 hours, from about 0.25 hour to about 6 hours, from about 0.5 hour to about 4 hours, from about 1 hour to about 3 hours, or of about 2 hours.

10. The method according to claim 1, wherein the heating rate in step (ii) is from about 0.1° C/min to about 20° C/min, from about 1° C/min to about 15° C/min, from about 1.5° C/min to about 10° C/min, from about 2° C/min to about 8° C/min, from about 4° C/min to about 6° C/min, or about 5° C/min.

11. The method according to claim 1, wherein the method comprises pretreating the cotton.

12. The method according to claim 11, wherein pretreating comprises pretreating the cotton with water and/or an aqueous solution.

13. The method according to claim 12, wherein the aqueous solution comprises an acid.

* * * * *